United States Patent
Machino

(10) Patent No.: US 8,036,825 B2
(45) Date of Patent: Oct. 11, 2011

(54) NAVIGATION SYSTEM

(75) Inventor: Hiroshi Machino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1030 days.

(21) Appl. No.: 11/907,586

(22) Filed: Oct. 15, 2007

(65) Prior Publication Data

US 2008/0183381 A1    Jul. 31, 2008

(30) Foreign Application Priority Data

Nov. 10, 2006 (JP) .................................. 2006-305584

(51) Int. Cl.
  *G01S 21/00* (2006.01)
(52) U.S. Cl. ........................................ 701/210; 701/209
(58) Field of Classification Search .................. 701/210, 701/209, 200; 340/990
  See application file for complete search history.

(56) References Cited

U.S. PATENT DOCUMENTS

| | | | |
|---|---|---|---|
| 5,184,303 A | 2/1993 | Link | |
| 5,878,368 A * | 3/1999 | DeGraaf | 701/209 |
| 6,701,250 B1 | 3/2004 | Rychlak | |
| 6,876,921 B2 * | 4/2005 | Omi | 701/207 |
| 7,099,773 B2 * | 8/2006 | Linn | 701/210 |
| 7,456,757 B2 | 11/2008 | Kanematsu | |

FOREIGN PATENT DOCUMENTS

| | | |
|---|---|---|
| DE | 19859078 | 6/2000 |
| DE | 10017427 | 10/2001 |
| DE | 102004037126 | 3/2006 |
| DE | 102005056360 | 6/2006 |
| JP | 2005-114552 A | 4/2005 |
| JP | 2005-172582 A | 6/2005 |
| JP | 2005-283168 A | 10/2005 |
| JP | 2006-17507 A | 1/2006 |
| JP | 2006-105600 A | 4/2006 |
| JP | 2006-162323 A | 6/2006 |
| JP | 2006-267122 A | 10/2006 |
| JP | 2006-292662 A | 10/2006 |

* cited by examiner

*Primary Examiner* — Mark Hellner
(74) *Attorney, Agent, or Firm* — Birch, Stewart, Kolasch & Birch, LLP.

(57) ABSTRACT

A navigation system includes current position calculating sections 10, 13, 14, and 15 calculating the current position; an input section 3 inputting the destination and transit points; a route searching section 130 searching a route from the current position calculated by the current position calculating section to the destination or the transit points inputted by the input section; and a guiding section 140 guiding a user along the route searched by the route searching section. The navigation system further includes a control section 10, which, when the route searched by the route searching section contains special roads, causes the propriety of use of the special roads contained the searched route to be individually selected, and makes a re-search for a route containing the special roads the use of which is selected by control of the control section.

7 Claims, 12 Drawing Sheets

FIG.4

| ROUTE CONDITION SETTING | | | MAP |
|---|---|---|---|
| ROUTE SEARCH PREFERENCE CONDITION : | FASTEST ROUTE | SHORTEST ROUTE | EASY ROUTE |
| USE CONTROL OF SPECIAL ROAD: | | YES | NO |
| EVASION OF SPECIFIED DISTRICT: | | YES | NO |
| EVASION OF TIME-REGULATED ROAD: | | YES | NO |
| DECISION | INITIAL VALUE | | RETURN |

FIG.5

| SPECIAL ROAD CONDITION SETTING | | | | MAP |
|---|---|---|---|---|
| | | | | (1/3) |
| USE CONTROL OF BRIDGE : | | | YES | NO |
| USE CONTROL OF TUNNEL: | | | YES | NO |
| USE CONTROL OF BYPASS: | | | YES | NO |
| USE CONTROL OF CAR-POOL: | | | YES | NO |
| USE CONTROL OF FERRY: | | | YES | NO |
| DECISION | INITIAL VALUE | PREVIOUS PAGE | NEXT PAGE | RETURN |

FIG. 8

ROUTE OUTLINE-TOLL ROAD      MAP

USE: ☑    ALL | GENERAL | TOLL

| ☑ | CHUGOKU EXPRESSWAY | 20km | 40 min | ￥1,000 | TOLL ROAD | INFORMATION |
| ☑ | FERRY TERMINAL | 20km | 40 min | ￥1,000 | FERRY | INFORMATION |
| ☑ | HIMEJI BYPASS | 50km | 1 hr 00 min | ￥1,500 | BYPASS | INFORMATION |
| ☑ | SANYO EXPRESSWAY | 50km | 1 hr 10 min | ￥2,000 | TOLL ROAD | INFORMATION |
| ☑ | AKASHI KAIKYO BRIDGE | 50km | 1 hr 00 min | ￥1,500 | BRIDGE | INFORMATION |

TOLL ROAD:    245km    5 hr 00 min    ￥15,000
GENERAL ROAD:   25km    1 hr 00 min    ￥0

● ALTERNATIVE ROUTE

DECISION

FIG. 9

ROUTE OUTLINE-GENERAL ROAD | | | | | ALL | GENERAL | TOLL | MAP

USE: ☑

| ☑ | NATIONAL ROAD 176 | 10km | 20 min | | ¥1,000 | GENERAL ROAD | INFORMATION |
| ☑ | PREFECTURAL ROAD 423 | 15km | 3 hr 30 min | | ¥1,000 | GENERAL ROAD | INFORMATION |
| ☑ | YAMATE KANSEN ROAD | 50km | 1 hr 00 min | | ¥1,500 | GENERAL ROAD | INFORMATION |
| ☑ | NATIONAL ROAD 2 | 50km | 1 hr 10 min | | ¥2,000 | GENERAL ROAD | INFORMATION |
| ☑ | NATIONAL ROAD 43 | 15km | 1 hr 00 min | | ¥1,500 | GENERAL ROAD | INFORMATION |

TOLL ROAD: 245km 5 hr 00 min ¥15,000
GENERAL ROAD: 25km 1 hr 00 min ¥0

◉ ALTERNATIVE ROUTE

DECISION

NAVIGATION SYSTEM

BACKGROUND OF THE INVENTION

1. Field of the Invention

The present invention relates to a navigation system making a route search from the current position to the destination or to transit points, and more particularly to a technology of finitely making a search according to a command for the propriety of use of special roads, such as, e.g., toll roads.

2. Description of the Related Art

Recently, the number of toll roads or toll special roads (hereinafter referred to as a "special road") has been going on increasing, including fee-charging bridges and tunnels, toll bypass roads, expressways (FWY), toll reserved roads, and ferries. In the conventional on-vehicle navigation system, a method has been accounted for the mainstream, in which it sets the propriety of use ("use" or "non-use") of special roads as a route condition before making a route search in a route search to the destination or to the transitpoints. In this case, e.g., when setting a condition that special roads are "used," a calculation of the optimum route is made by taking all special roads to the destination into consideration, or, when setting a condition that special roads are "not used," a calculation of the optimum route is made by not completely taking special roads to the destination into consideration.

In this connection, as a related art, Patent Document 1 discloses a navigation system which can present, by design, routes of a variety of toll fares to a user to increase the degree of freedom of user's route selection. In the navigation system, a searching section sequentially changes the cost of the toll roads to search for a plurality of potential candidate routes; a calculating section calculates a toll fare of each of the potential candidate routes searched by the searching section; the selecting section selects a plurality of routes of different toll fares from the plurality of searched candidate routes based on the result searched by the searching section and the result calculated by the calculating section; and a presenting section presents information on the plurality of routes selected by the selecting section.

Patent Document 1: JP-A2006-017507

In the conventional navigation system mentioned above, when the propriety of use of the special roads is set as a route condition, only specification of the use of all the special roads to the destination or the non-use of all the special roads is permitted. In general, a user has a propensity to select the use of the individual special roads by thinking about a charge for using the special roads or cost performance thereof, such as toll fares of the individual special roads to the destination or time efficiency thereof in limited conditions (for example, a user wants to use some of toll roads only in a commuting time period). Therefore, it has been hitherto on the tiptoe of expectancy of the development of a navigation system able to specify the propriety of use of the individual special roads.

SUMMARY OF THE INVENTION

The present invention has been made to meet the above-described needs, and an object of the present invention is to provide a navigation system which is capable of making a route search by specifying the propriety of use of individual special roads to the destination.

In order to solve the above-mentioned problem, the navigation system according to the present invention includes a current position calculating means for calculating the current position of a vehicle; an input means for inputting the destination and transit points thereof; a route searching section searching for a route from the current position calculated by the current position calculating means to the destination or the transit points inputted by the input means; and a guiding section guiding a user along the route searched by the route searching section; wherein the navigation system further comprises a control section, which, when the route searched by the route searching section contains special roads, causes the use or the non-use of the special roads contained in the searched route to be individually selected, and the route searching section makes a re-search for a route containing the special roads of which propriety of use is selected by control of the control section.

According to the navigation system of the present invention, it is arranged such that, when the searched route contains special roads, the propriety of use of the special roads contained in the searched route is individually selected, and a route containing the special roads of which propriety of use is selected is re-searched for, which enables a route search in which the propriety of use of the individual special roads to the destination is specified.

BRIEF DESCRIPTION OF THE DRAWINGS

FIG. 4 is a drawing showing an example of a route condition setting screen used in the navigation system;

FIG. 5 is a drawing showing an example of a special road condition setting screen used in the navigation system;

FIG. 8 is a drawing showing an example of a route outline screen displaying only toll roads used in the navigation system;

FIG. 9 is a drawing showing an example of a route outline screen displaying only general roads used in the navigation system;

DETAILED DESCRIPTION OF THE PREFERRED EMBODIMENTS

Embodiments of the present invention will now be described below in detail with reference to the accompanying drawings.

First Embodiment

Figure 1:
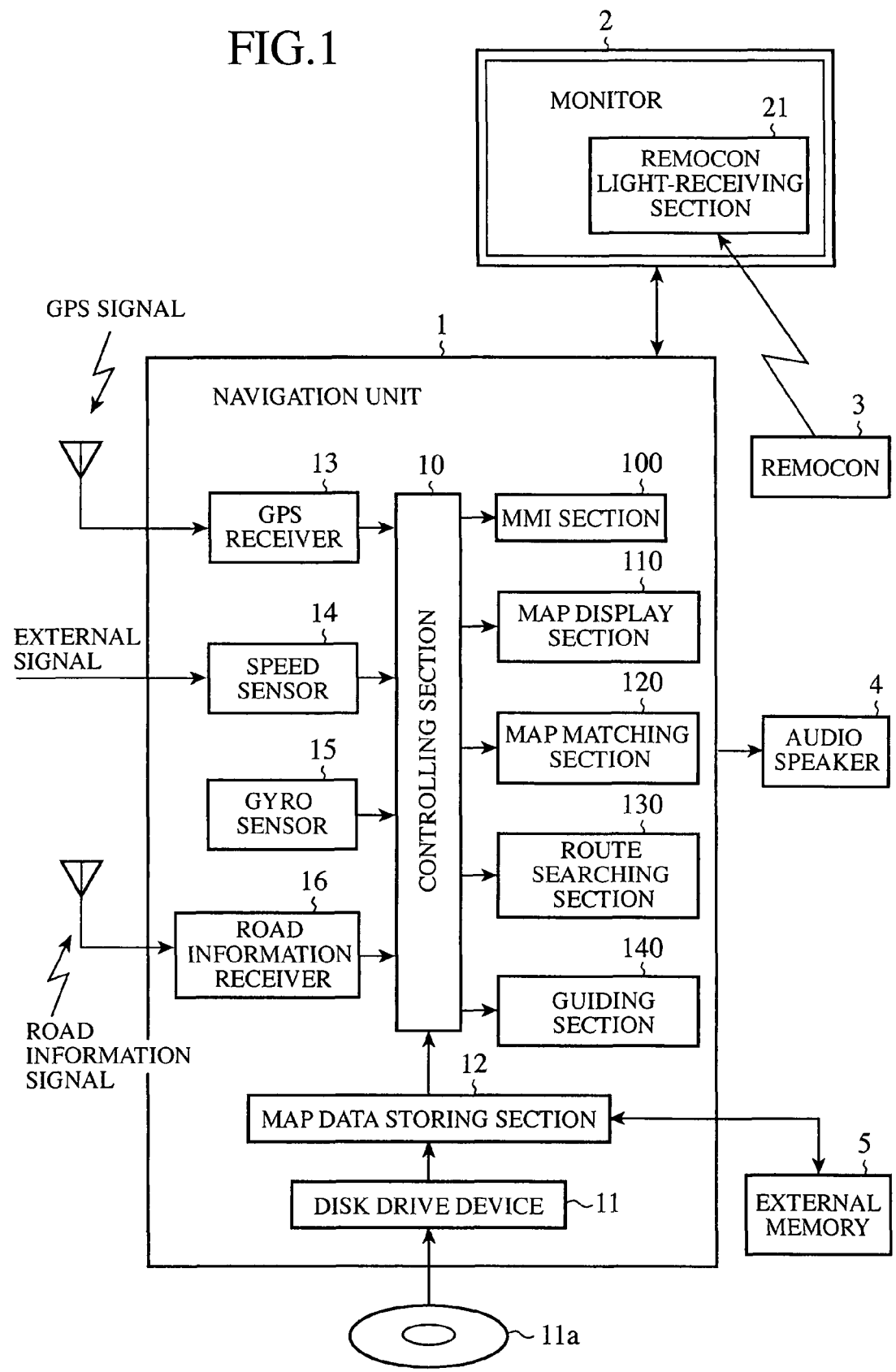
FIG. 1 is a block diagram showing a configuration of a navigation system according to the first embodiment of the present invention.

FIG. 1 is a block diagram showing a configuration of a navigation system according to the first embodiment of the present invention. This navigation system includes a navigation unit 1; a monitor 2 for displaying maps; a remote controller (hereinafter referred to as a "remocon") 3; an audio speaker 4; and an external memory 5.

The navigation unit 1 is the nucleus in the navigation system, and performs processing such as a map display, a route search, and guidance. The detail of the navigation unit 1 will be mentioned later.

The monitor 2 is composed of an LCD (Liquid Crystal Display), for example, and displays maps, a mark of the current position of a vehicle, a searched guidance route, and other various messages in response to a display signal sent from the navigation unit 1. The monitor 2 is provided with a remocon light-receiving section 21. The remocon light-receiving section 21 receives an optical signal sent from the remocon 3, and sends it to the navigation unit 1 through the monitor 2.

The remocon 3 corresponds to an input means of the present invention, and is used for inputting the destination or transit points by a user at the time of a route search, or for responding to messages, which are outputted from the monitor 2 or the audio speaker 4 to prompt a user to do an operation. In this context, in place of the remocon 3 or in combination with the remocon 3, a touch panel may be provided, in which a variety of information is inputted by directly touching to a touch sensor mounted on a screen of the monitor 2.

The audio speaker 4 outputs a guidance message by voice in response to an audio signal sent from the navigation unit 1. The external memory 5 is optional, and is composed of an HDD (Hard Disk Drive), for example. The external memory 5 stores map data similar to that stored in a record medium inserted in a disk drive device 11 described later.

The navigation unit 1 will now be detailed below. The navigation unit 1 consists of a control section 10; the disk drive device 11; a map data storing section 12; a GPS (Global Positioning System) receiver 13; a speed sensor 14; a gyro sensor 15; a road information receiver 16; a man-machine interface section (hereinafter referred to as an "MMI") 100; a map display section 110; a map matching section 120; a route searching section 130; and a guiding section 140.

The control section 10 consists of a microcomputer, for example, and controls the entire navigation unit 1. The MMI section 100, map display section 110, map matching section 120, route searching section 130, and guiding section 140 are each composed of an application program being executed under the control of the microcomputer.

The disk drive device 11 reproduces recorded contents of a record medium 11a such as a DVD (Digital Versatile Disc) or a CD (Compact Disc), in which the map data is recorded, by inserting the record medium into the disk drive device. The map data is defined by nodes, road links, or the like, and contains link information on special roads, i.e., toll roads or toll special roads, including those which are permitted to pass by payment of fares, such as bridges, tunnels, toll bypass roads, expressway (FWY), toll reserved roads, and ferries. The map data reproduced by the disk drive device 11 is sent to the map data storing section 12.

The map data storing section 12 temporarily stores the map data sent from the disk drive device 11 or the external memory 5. The map data stored in the map data storing section 12 is used for a map display and a route search touched upon later.

The GPS receiver 13 detects the current position of a vehicle based on GPS signals received from a GPS satellite through its antenna. The data of the current position indicating the current position of the vehicle, which is detected by the GPS receiver 13, is sent to the control section 10. The speed sensor 14 detects a moving speed of the vehicle based on an external signal sent from the vehicle on which the navigation system is mounted. The speed data representing the moving speed of the vehicle, detected by the speed sensor 14, is sent to the control section 10.

The gyro sensor 15 detects a running direction of the vehicle. Orientation data indicating the running direction of the vehicle, detected by the gyro sensor 15, is sent to the control section 10. The control section 10 detects the current position of the vehicle by a self-contained navigation based on the speed data from the speed sensor 14 and the orientation data from the gyro sensor 15. Even when the GPS receiver 13 cannot detect the current position of the vehicle due to a tunnel or the like, for example, the navigation system can always correctly detect the current position thereof since the current position of the vehicle can be detected by the self-contained navigation. The current-position calculating means of the present invention is composed of the GPS receiver 13, the speed sensor 14, the gyro sensor 15, and the control section 10 processing the data sent from these devices.

A road information receiver 16 receives a road information signal sent from the road traffic data communication system, for example. The road information signal received by the road information receiver 16 is sent to the control section 10. The control section 10 makes a message representing information on a traffic snarl of the road based on the road information signal. The message is informed to a user through the monitor 2 and the audio speaker 4.

The MMI section 100 processes a command created by operating an operation panel (not shown) or a command sent from the remocon 3 through the monitor 2. The MMI section 100 provides communication between the navigation system and a user. The map display section 110 generates drawing data for causing the monitor 2 to display maps thereon. Maps are on the screen of the monitor 2 by sending of the drawing data generated by the map display section 110 to the monitor 2.

The map matching section 120 brings a vehicle location created based on the data of the current position sent from the GPS receiver 13 or the data of the current position generated using the speed data sent from the speed sensor 14 and the orientation data sent from the gyro sensor 15, into correspondency with the map represented by the map data read out from the map data storing section 12, and forms a mark of the vehicle location on the map.

The route searching section 130 searches for a route from the current position of the vehicle to the destination. The details of the process carried out by the route searching section 130 will be described later. The guiding section 140 generates a guide map and a voice guidance message to be outputted when the vehicle moves along the route searched by the route searching section 130. The guide map is displayed on the monitor 2, and the voice guidance message is outputted from the audio speaker 4.

Then, the operation of the navigation system thus arranged as above will be described, with route search processing making a route search as the center, in which the starting position (the current position, for example) and the destination are set to search for a route therebetween, by reference to the flowchart shown in FIG. 2, the state transition diagram representing transitions shown in FIG. 3, and an example of screens shown in FIGS. 4-13.

When the navigation system is powered, the data of the current position data and the map data are acquired first (step ST11). In other words, the control section 10 sends the data of the current position acquired from the GPS receiver 13 or the data of the current position detected by an autonomous navigation to the map matching section 120. Further, the disk drive device 11 reads out the map data from the record medium set and stores the data in the map data storing section 12. The map matching section 120 reads out the map data from the map data storing section 12, and carries out a matching process in which a vehicle position mark is superposed on a position corresponding to the data of the current position received from the control section 10. The map data having undergone the matching process is sent to the map display section 110. The map display section 110 generates drawing data based on the map data sent from the map matching section 120, and sends the data to the monitor 2.

Then, a current position screen is displayed (step ST12). That is, the monitor 2 displays a map, with the current position of the vehicle as the center, based on the drawing data received from the map display section 110. Subsequently, a route condition is set (step ST 13). To put it concretely, a route condition setting screen shown in FIG. 4 is displayed. On the route condition setting screen, each of the portions encircled by a rectangle indicates a button, and a user can have a function assigned to the button carry out by selecting the button using the remocon 3. The same holds true for screens described later.

On the route condition setting screen shown in FIG. 4, a user can select one of "Fastest Route," "Shortest Route," and "Easy Route" as a route searching preference condition. Further, a user can select either "Yes" or "No" for use control of special road, an evasion of specified area, and an evasion of time-regulated road. When the above selections are completed, a user touches the "Decision" button. This determines the route conditions. Say in addition, an "Initial Value" button shown in FIG. 4 is used for restoring the route condition to an initial value, and a "Return" button is used for returning to the previous screen. Further, a "Map" button is used for returning to the map screen of the current position. The same holds true for each of the screens explained hereinbelow.

After that, it is checked whether or not the use control of special road is carried out (step ST14). In other words, it is checked in step ST13 whether or not the "Yes" button of an item of the use control of special road is touched on the route condition setting screen shown in FIG. 4.

If it is judged in the above step ST14 that the use control of special road is carried out, i.e., the "Yes" button of the item of the use control of special road is touched on the route condition setting screen, then the destination is set (step ST15). To say more preciously, a user specifies the destination on the map displayed on the monitor 2 through the remocon 3. Thereby, the monitor 2 sends the data representing the destination specified by the remocon 3 to the route searching section 130 of the navigation unit 1.

In turn, a route using no special road is displayed (step ST16). To say more exactly, the route searching section 130 searches for a route from the current position specified by the data of the current position received from the GPS receiver 13 through the control section 10 or from the current position detected by the autonomous navigation to the destination set in step ST15, without using the special roads, and sends the data indicating the searched route to the map display section 110. This displays on the monitor 2 a screen on which the route from the current position to the destination is displayed on the map.

Subsequently, a route search is made using the least possible special roads (step ST17). To be more precise, the route searching section 130 searches for a route using the least possible special roads, from the current position specified by the data of the current position received from the GPS receiver 13 through the control section 10 or from the current position detected by the autonomous navigation to the destination set in step ST15, and sends the data representing the searched route to the map display section 110.

After that, route guidance is started (step ST 18). To say more preciously, the guiding section 140 generates display data indicating a guidance message based on the route searched in step ST16 to send the data to the monitor 2, and at the same time, generates an audio signal representing the guidance message to send it to the audio speaker 4. This displays the guidance message on the monitor 2, and simultaneously generates a message from the audio speaker 4 by voice. Thereafter, guidance messages corresponding to the environment changing with traveling of the vehicle is outputted in succession.

If it is judged in the above step ST14 that the use control of special road is not carried out, i.e., the "No" button of the item of the use control of the special road is touched on the route condition setting screen, a special road condition setting screen shown in FIG. 5 is displayed. On the special road condition setting screen shown in FIG. 5, a user selects either "Yes" or "No" of the subitems including the use control of bridge, the use control of tunnel, the use control of bypass road, the use control of car-pool, and the use control of ferry. When the above selections are finished, a user touches the "Decision" button. This determines a special road condition.

Remark parenthetically, the "Initial Value" button on the special road condition setting screen shown in FIG. 5 is used for restoring the special road condition to an initial value, a "Previous Page" is used for returning to the special road condition setting screen shown on the previous page (FIG. 4 shows an example of three special road condition setting screens.), and a "Next Page" is used for proceeding to the special-road condition setting screen shown on the next page. Additionally, a "Return" button is used for returning to the previous screen.

Then, it is checked whether or not one or more of the subitems shown on the special road condition setting screen are selected (step ST19). Namely, on the special road condition setting screen shown in FIG. 5, it is checked whether or not one or more of the "Yes" buttons of the subitems are touched. If it is judged in step ST19 that no subitems are selected, the process proceeds to step ST 15, and the processing mentioned above is executed.

Otherwise, if it is judged in step ST19 that one or more of the subitems are selected, the destination is set (step ST20) The processing in step ST20 is the same as that in the above step ST15.

Subsequently, a route search is made using the special roads (step ST21). To say more preciously, the route searching section 130 searches for a route from the current position specified by the data of the current position received from the GPS receiver 13 through the control section 10 or from the current position detected by the autonomous navigation to the destination set in step ST20, according to the conditions set on the special road condition setting screen shown in FIG. 5, and sends the route data representing the searched route to the map display section 110.

Figure 6:
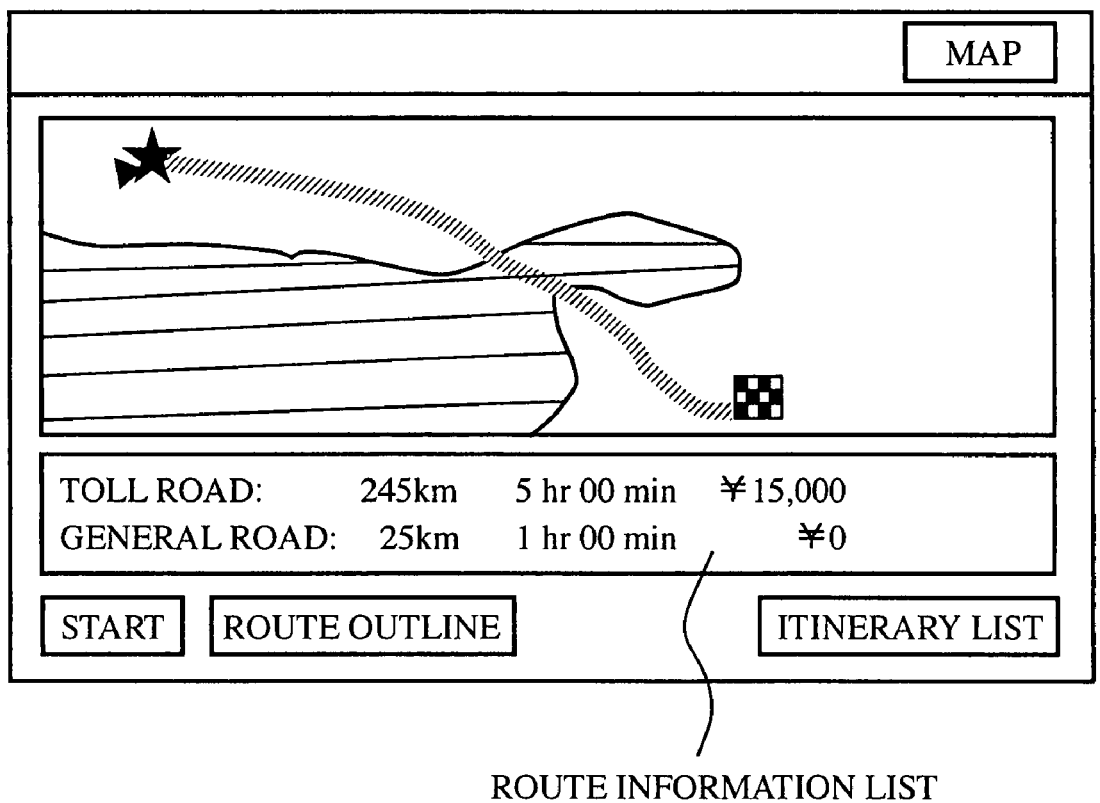
FIG. 6 is a drawing showing an example of a route checking screen used in the navigation system.

Then, a display and a selection of the route confirming screen are executed (step ST22). To say more exactly, the map display section 110 displays a route confirming screen as shown in FIG. 6 on the monitor 2 based on the route data representing the route searched in step ST21. On the route confirming screen, the map containing the searched route is displayed, and at the same time, a route information list is displayed, including the distance, a passing time, and a toll of each of the toll roads and general roads constituting the searched route.

A "Start" button of the route confirming screen shown in FIG. 6 is used for starting route guidance, a "Route Outline" is used for transitioning to the route outline screen, and an "Itinerary List" is used for displaying an itinerary list screen. In step ST22, when the "Start" button is touched, the process proceeds to step ST18, and the route guidance mentioned above is started.

Figure 7:
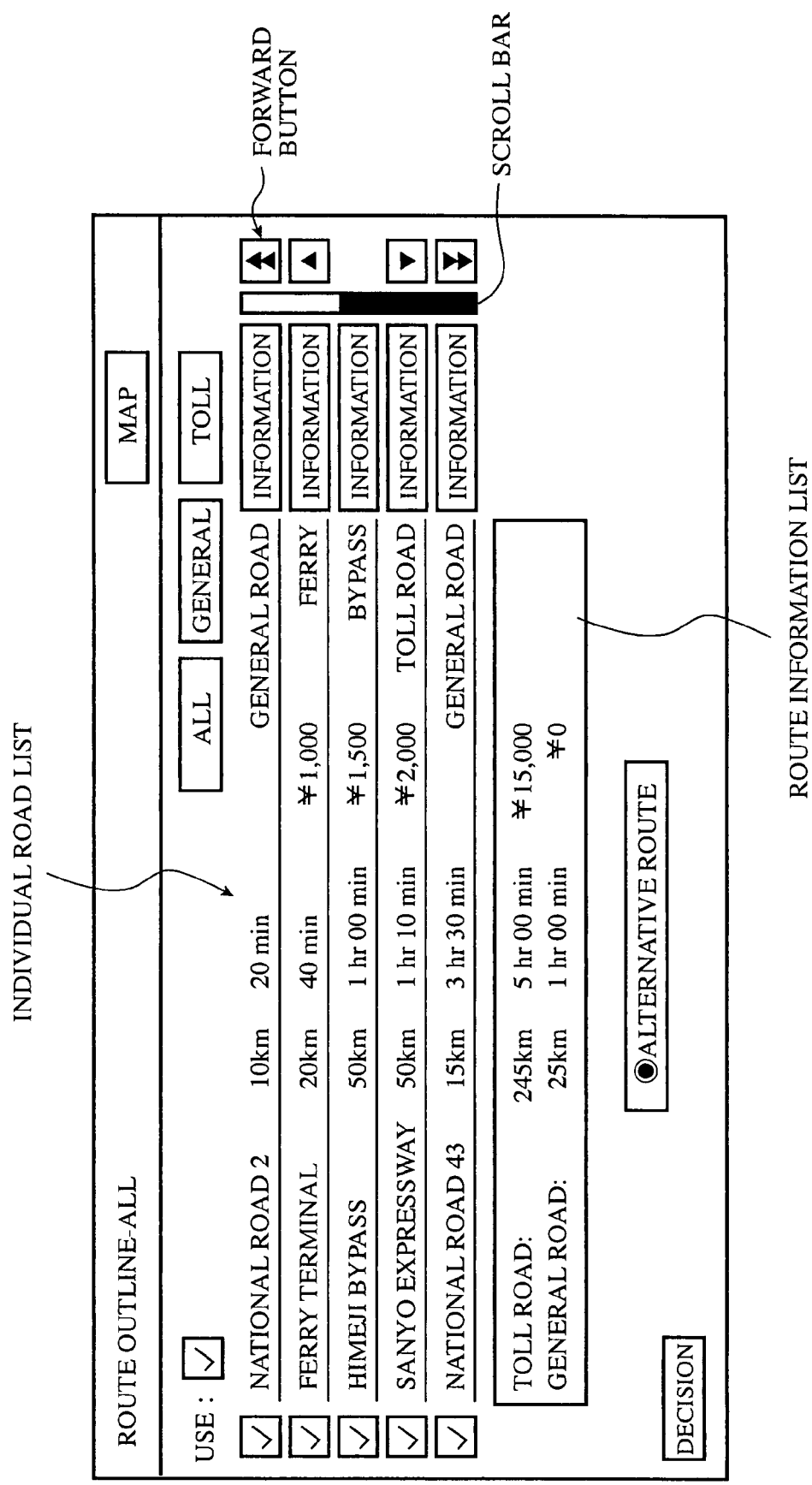
FIG. 7 is a drawing showing an example of a route outline screen displaying the all routes used in the navigation system.

In step ST22, when the "Route Outline" button is selected, a route outline display and a selection are executed (step ST23) To say more preciously, the map display section 110 displays a route outline screen as shown in FIG. 7, FIG. 8, or FIG. 9 on the monitor 2. On the route outline screen, a "All" button is used for displaying the all routes as shown in FIG. 7, a "General" button is used for displaying general roads as shown in FIG. 9, and a "Toll" button is used for displaying toll roads as shown in FIG. 8.

On the screen showing the all routes, shown in FIG. 7, the route information list (which is the same as the route information list shown in FIG. 5) is displayed, and at the same time, individual roads constituting the searched route (hereinafter referred to as an "individual road") are displayed in the form of a list. The list in which these individual roads are displayed is called as an "Individual Roads List." Similarly, on the screen showing the toll roads of the route, shown in FIG. 8, only individual roads, which are toll roads, are displayed in the Individual Road List. Further, on the screen showing the general roads of the route, shown in FIG. 9, only individual roads, which are general roads, are displayed in the Individual Road List. The route outline screens shown in these FIG. 7, FIG. 8, and FIG. 9 are different only in the content of the Individual Road List, except the other portions thereof. Accordingly, an explanation will be given hereinbelow by reference to the route outline screen shown in FIG. 6.

Check buttons are provided on the head of each of the individual roads constituting the Individual Road List of the route outline screen, and a user can determine whether or not the individual road is used by checking a check button.

Figure 10:
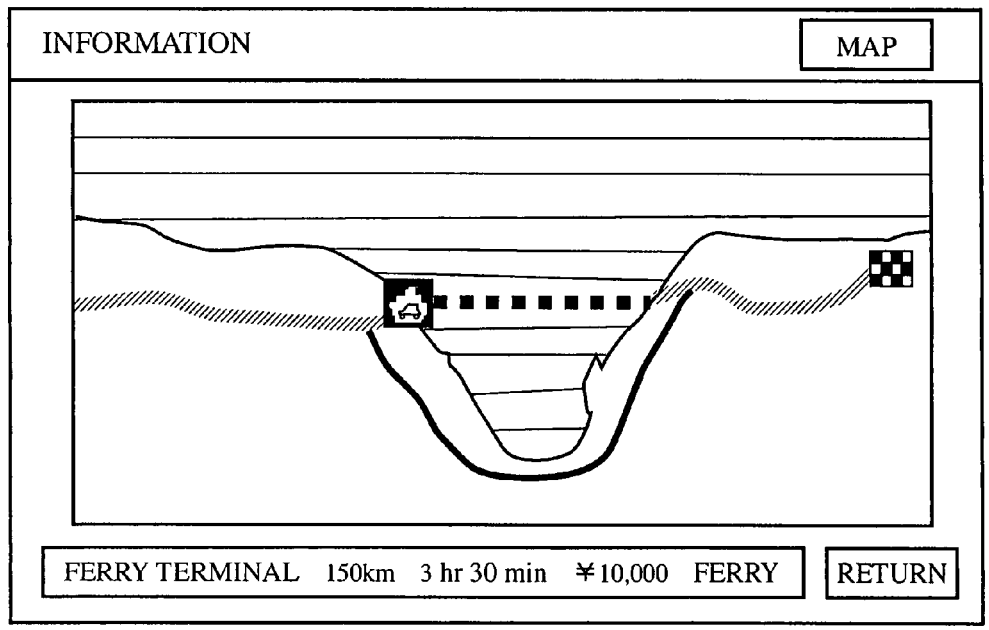
FIG. 10 is a drawing showing an example of a screen displaying the detailed information on individual roads used in the navigation system.

Further, each of the individual roads is provided with an "Information" button, and a user can know the details about the individual road corresponding to the "Information" button by touching the "Information" button. For example, when a "Ferry Terminal" of the individual road is touched, a screen of the detailed information as shown in FIG. 10 is displayed on the monitor 2. The detailed information contains the road name (facilities name); a toll fare; the length to be used or the total length, a passing time period, and a type of the road (facilities). The "Return" button of the screen of the detailed information is used for returning to the route outline screen.

Furthermore, a scroll bar and forward buttons are provided on the right edge of the Individual Road List of the route outline screen. The scroll bar is used for scrolling the whole Individual Road List in the upward and downward direction. Moreover, the forward button is used for forwarding upward or downward the Individual Road List on an individual road basis, or is used for displaying individual roads from the head or the tail of the individual road list in turn.

Figure 11:
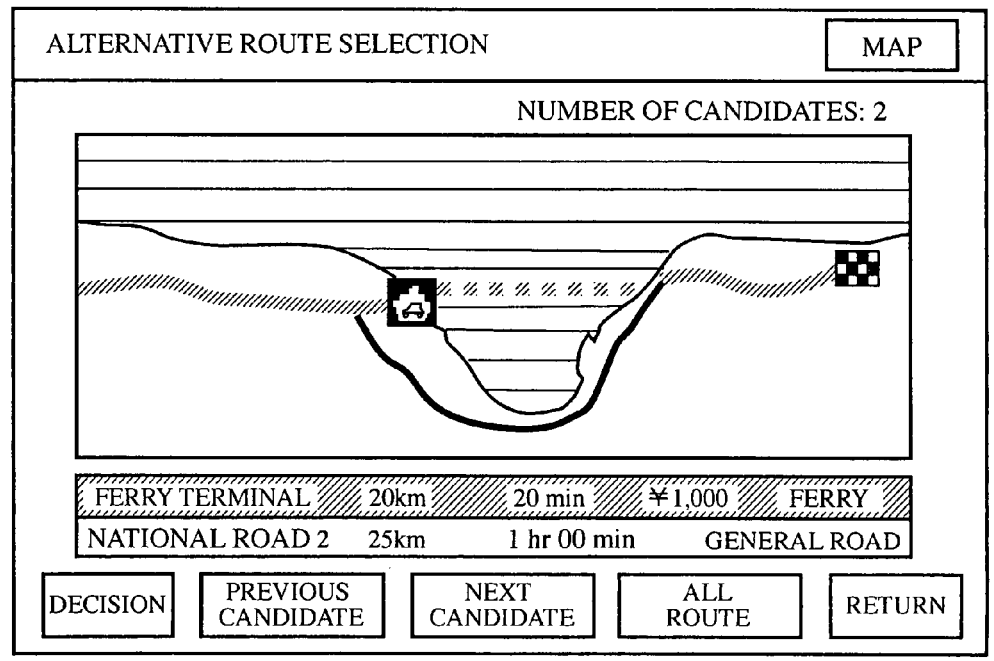
FIG. 11 is a drawing showing an example of an alternative route selecting screen used in the navigation system.

Moreover, an "Alternative Route" button of the route outline screen is used for searching for an alternative route of the individual road. When the "Alternative Route" button is touched, an alternative route is searched, and an alternative route selecting screen containing an alternative route as shown in FIG. 11 is displayed after the route is changed. On the alternative-route selecting screen, a "Previous Candidate" button is used for selecting a previous alternative route, and a "Next Candidate" button is used for selecting the next alternative route. By touching the "Decision" button after one alternative route is selected by the "Previous Candidate" button or the "Next Candidate" button, the setting is thereby changed to an alternative route and the process returns to the route outline screen.

Figure 12:
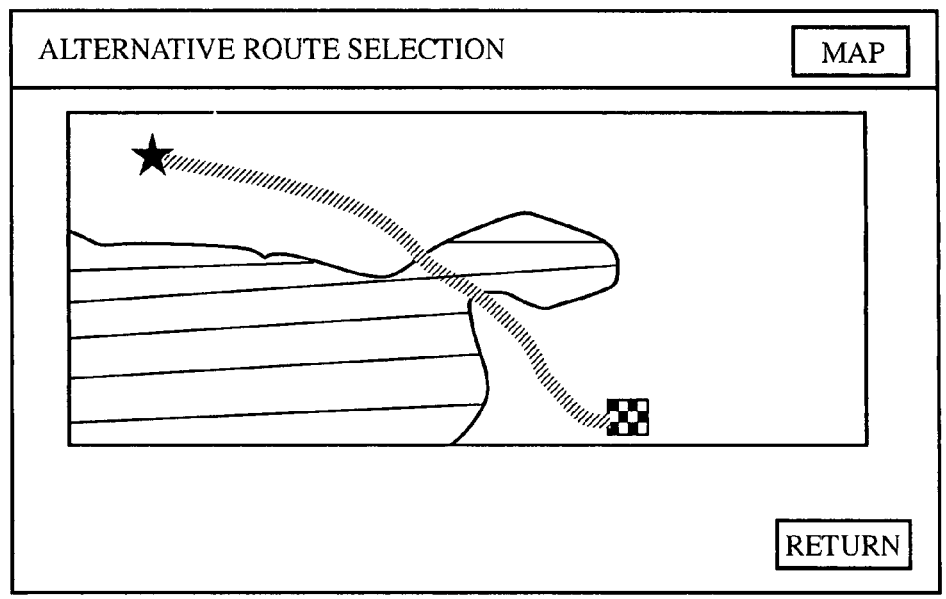
FIG. 12 is a drawing showing an example of a screen displaying the all routes, on which a change of the alternative route is reflected, used in the navigation system.

Moreover, a "Whole Route" button of the alternative route selecting screen is used for displaying the all routes on which a change of the alternative route as shown in FIG. 12 is reflected. This provides a user with an occasion to temporarily confirm the all routes. When the "Return" button of the screen shown in FIG. 12 is touched, the process returns to the alternative route selecting screen. Furthermore, the "Return" button of the alternative route selecting screen is used for returning to the route outline screen.

Besides, the "Decision" button of the route outline screen is used for deciding the contents set in the route outline screen. By touching the "Decision" button, the setting is changed to the contents set in the route outline screen, and the process returns to the route confirming screen.

In step ST23, when the "Decision" button is touched after a check of the check button on the route outline screen is changed, the process returns to step ST21, and a route search is made again according to the conditions changed in step ST23. In contrast, when the "Decision" button is touched without changing a check of the check button on the route outline screen, the process returns to step ST22, and the route confirming screen shown in FIG. 6 is displayed. Then, when the "Start" button is touched on the route confirming screen, the process proceeds to step ST18, and route guidance is started.

Figure 2:
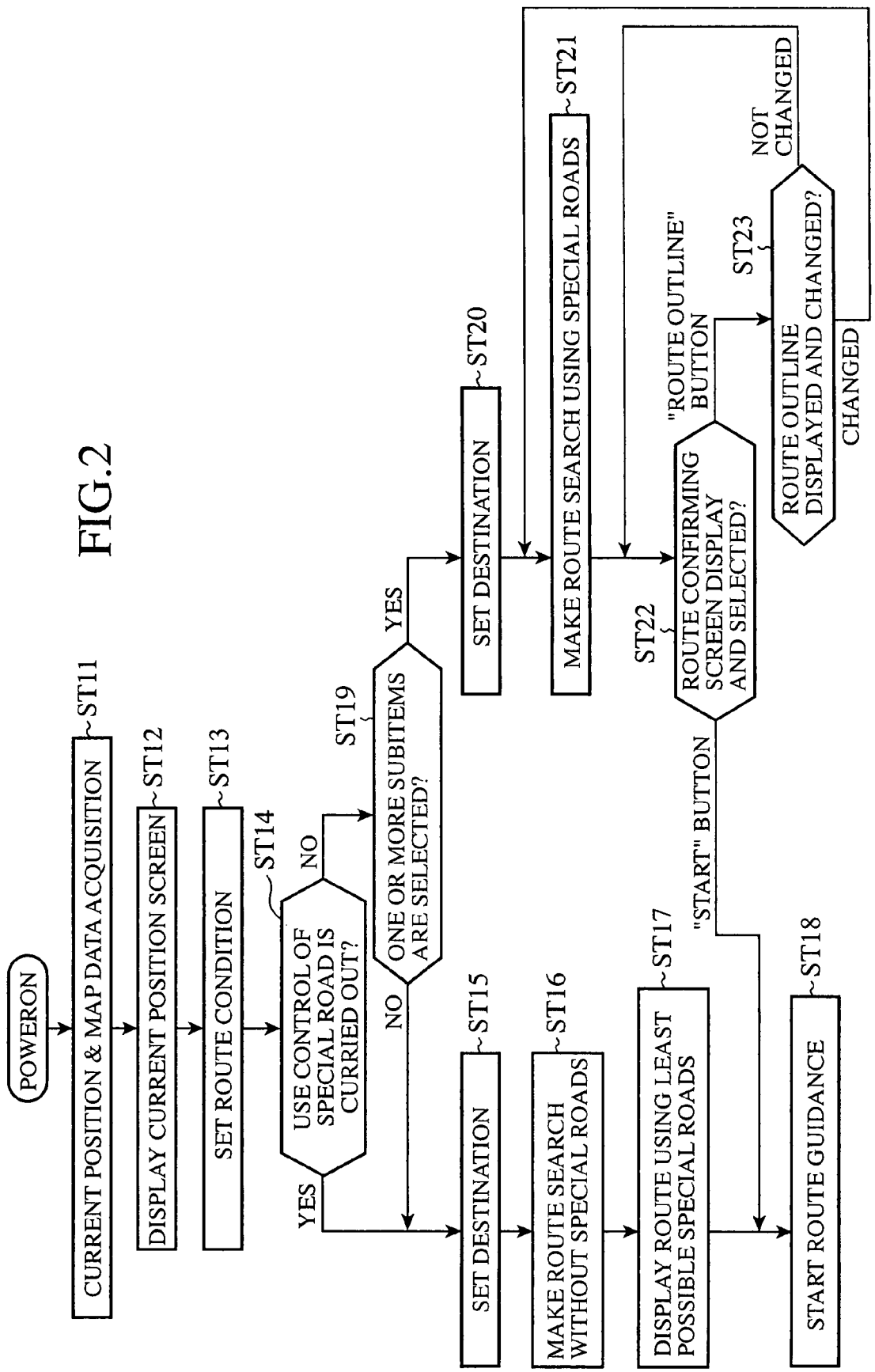
FIG. 2 is a flowchart showing an operation of the navigation system.
Figure 3:
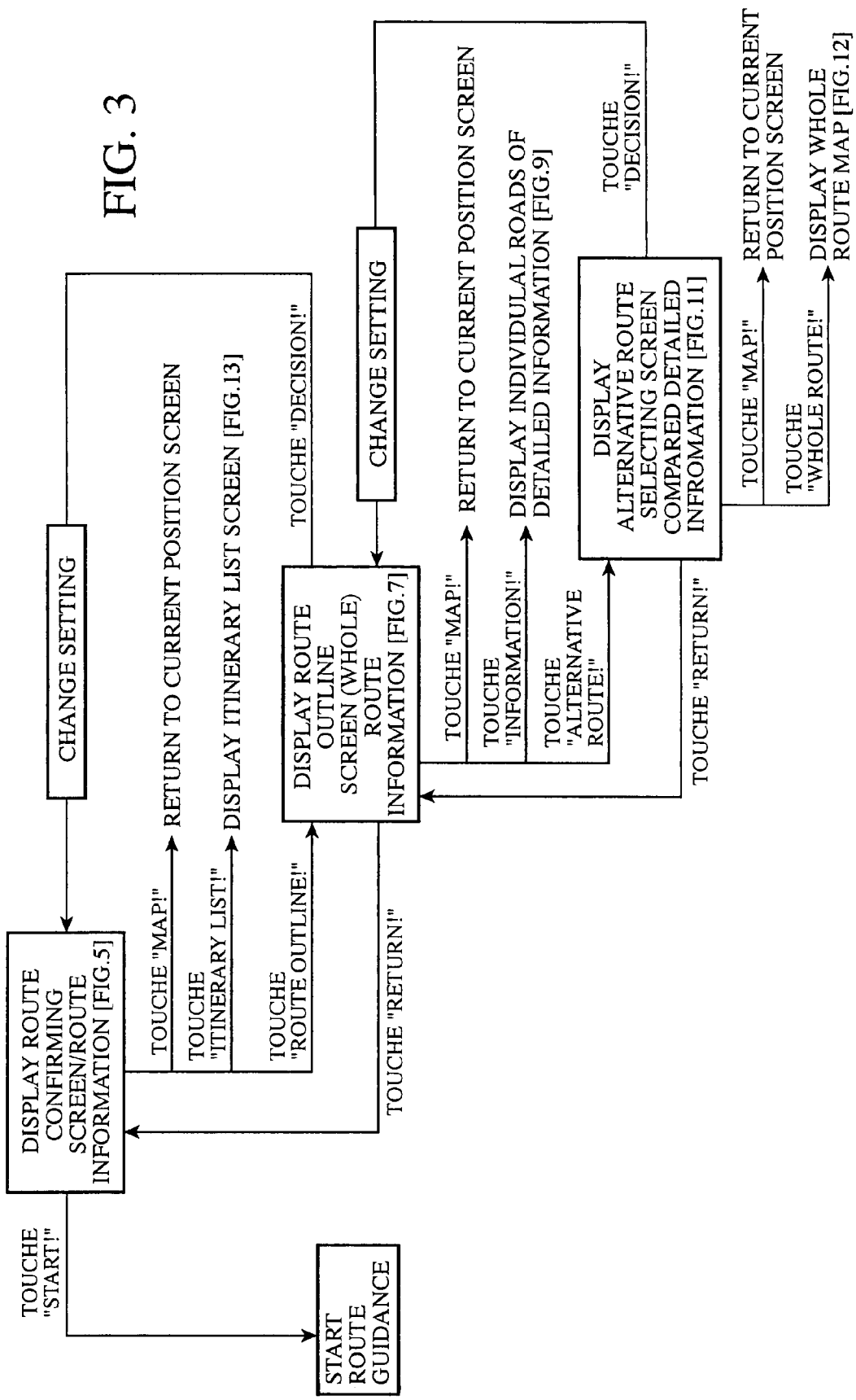
FIG. 3 is a state transition diagram showing how a state is transitioned by an operation in the navigation system.
Figure 13:
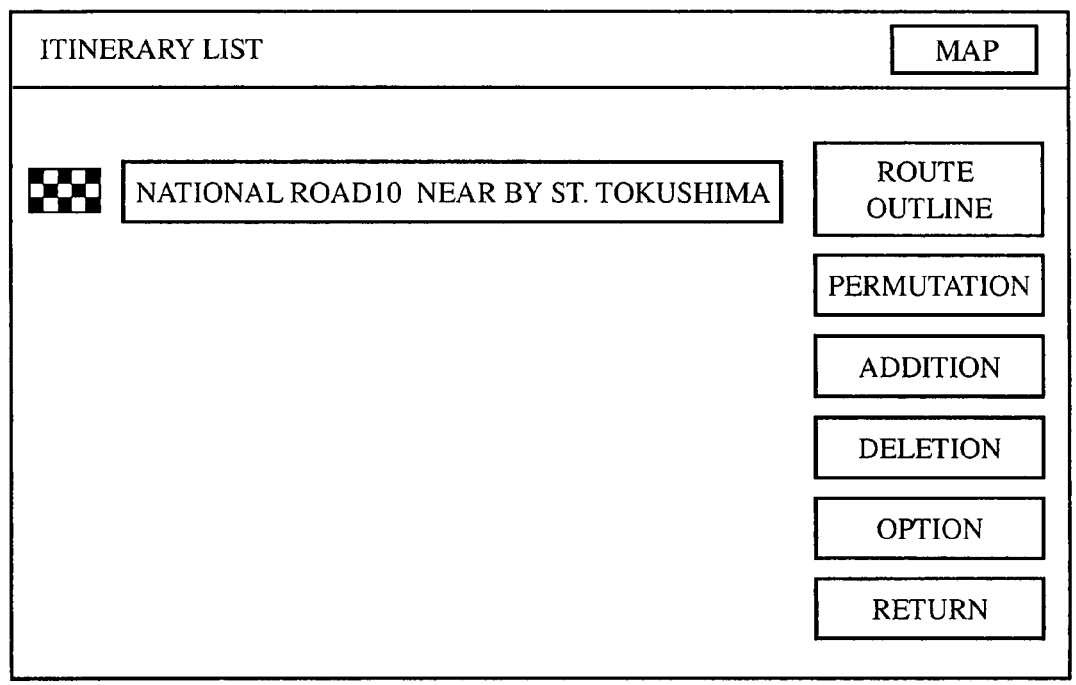
FIG. 13 is a drawing showing an example of an itinerary list screen used in the navigation system according to the first embodiment.

In step ST22, when the "Itinerary List" button on the route confirming screen is selected, an itinerary list screen as shown in FIG. 13 is displayed, though the description thereof is omitted in the flowchart shown in FIG. 2. On the itinerary list screen, the destination and transit points are displayed in list form at the center thereof, and in the same instance, a "Route Outline" button, a "Permutation" button, an "Addition" button, a "Delete" button, an "Option" button, and a "Return" button are displayed at the right of the screen.

On the itinerary list screen, when the "Route Outline" button is touched, the process returns to the route outline screen. When the "Sorting" button is touched, permutation of the list of the destination and the transit points is carried out. When the "Addition" button is touched, an addition of the destination and transit points is executed. When the "Delete" button is touched, the destination and the transit points are deleted. When the "Option" button is touched, the other functions are performed. When the "Return" button is touched, the process returns to the previous screen.

As described above, according to the navigation system of the first embodiment of the present invention, a user can select the proprietary of use of these special roads, considering availability and cost performance of the individual special roads existing in the route to the destination, which enables presenting, by a simple operation, the route using the special roads in answer to a user's will.

Second Embodiment

The navigation system according to the second embodiment of the present invention is arranged to make a route search for the destination, as a route condition, without setting the proprietary of use of the special roads prior to making a route search. A configuration of the navigation system is the same as that of the navigation system according to the first embodiment shown in FIG. 1.

Figure 14:
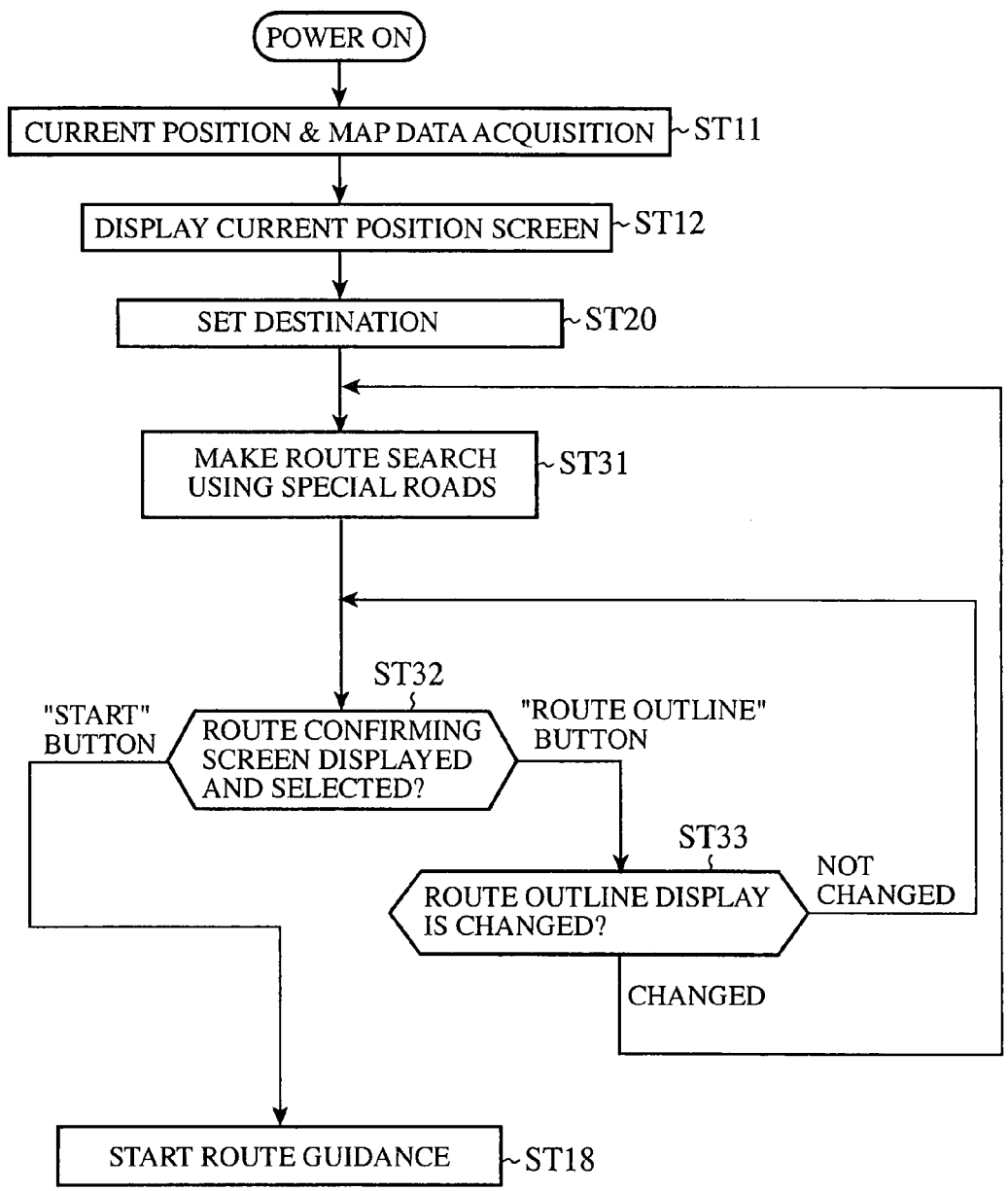
FIG. 14 is a flowchart showing an operation of the navigation system according to the second embodiment of the present invention.

The operation of the navigation system according to the second embodiment will next be explained by referring to a flowchart shown in FIG. 14, with processing of selecting the individual special roads after a route search by setting the starting position (the current position, for example) and a destination as the center. It should be noted that the steps of carrying out the processings, which are identical or correspond to the flowchart shown in FIG. 2, are designated by the same reference numerals as those used in FIG. 2 for simplification of an explanation thereof.

When the navigation system is powered, the data of the current position and the map data are acquired first (step ST11). Then, a current position screen is displayed (step ST12). To put it concretely, the monitor 2 displays a map, with the current position of a vehicle as the center, based on the drawing data received from the map display section 110. Subsequently, the destination is set (step ST20).

After that, a route search is made using the special roads (step ST31). In concrete terms, the route searching section 130 searches for a route, by unconditionally using the special roads, from the current position specified by the data of the current position received from the GPS receiver 13 through the control section 10 or from the current position detected by the autonomous navigation to the destination set in step ST20, and sends the data representing the searched route to the map display section 110.

Thereafter, a display and a selection of the route-confirming screen are executed (step ST32). To be concrete, the map display section 110 displays the route confirming screen as shown in FIG. 6 on the monitor 2 based on the data indicating the route searched in step ST31. In step ST32, when the "Start" button is touched, the process proceeds to step ST18, and route guidance is started. Meanwhile, in step ST32, when the "Route Outline" button of the route confirming screen is selected, a display and a change of the route outline are executed (step ST33). To be more exact, the map display section 110 displays the route outline screen as shown in FIG. 7, FIG. 8, or FIG. 9 on the monitor 2.

In step ST33, when the "Decision" button is touched after a check of the check button on the route outline screen is changed, the process returns to step ST31, and a route search is made again according to the conditions changed in step ST33. In contrast, when the "Decision" button is touched without changing a check of the check button on the route outline screen, the process returns to step ST32, and the route confirming screen shown in FIG. 6 is displayed. Then, when the "Start" button is touched on the route confirming screen, the process proceeds to step ST18, and route guidance is started. This successively outputs thereafter a guidance message corresponding to the environment changing with running of the vehicle.

In passing, when the "Route Outline" button is touched again on the route confirming screen, the process proceeds to step ST33, and the above-described display and the change of the route outline are carried out again. In addition, the operation at which the "Itinerary List" button is touched on the route confirming screen is the same as that as with the first embodiment mentioned above.

Third Embodiment

The navigation system according to the third embodiment of the present invention is arranged to enable a user to confirm and change routes after completion of a route search containing the special roads. A configuration of the navigation system is the same as that according to the first embodiment shown in FIG. 1.

Figure 15:
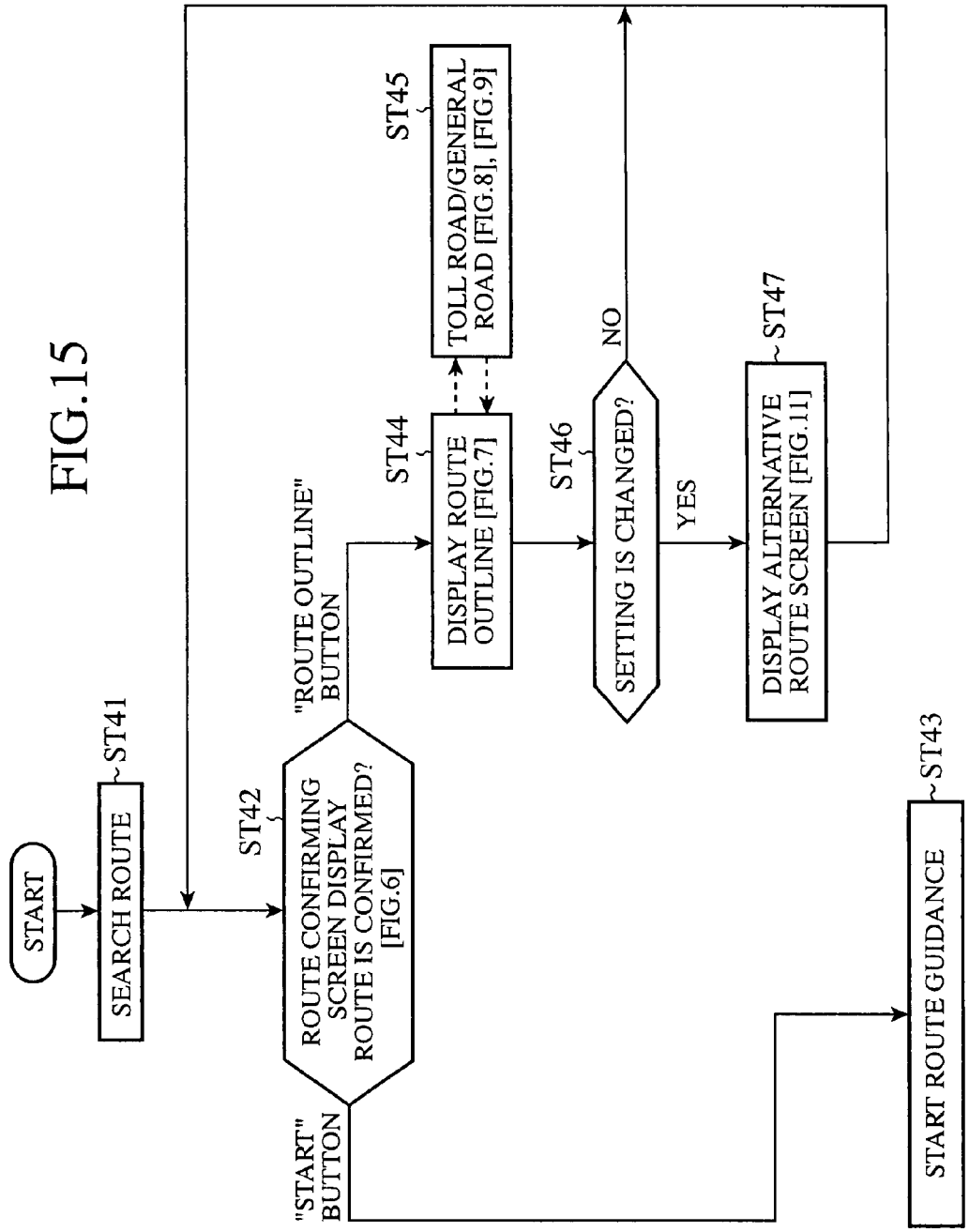
FIG. 15 is a flowchart showing an operation of a navigation system according to the third embodiment of the present invention.

The operation of the navigation system according to the third embodiment will next be explained by referring to a flowchart shown in FIG. 15.

First of all, a route search to the destination containing the special roads is made (step ST41). Exactly speaking, a route search is made, which is similar to that by the navigation system according to the first embodiment or the second embodiment. Then, the searched route containing the special roads is displayed as a route confirming screen as shown in FIG. 6 (step ST42). On the route confirming screen, when a user does not change the searched route containing the special roads, the user touches the "Start" button. Thereby, it is judged in step ST42 that the "Start" button is touched, and route guidance is started (step ST 43). The operation in step ST43 is the same as that by the navigation system according to the first embodiment in step ST18 shown in FIG. 2.

On the route confirming screen, when a user changes the searched route containing the special roads, the user touches the "Route Outline" button. Thereby, it is judged in step ST42 that the "Route Outline" button is touched, and the route outline screen displaying the all routes as shown in FIG. 7 is displayed (step ST44). On the route outline screen, when the "General" button or the "Toll" button is touched, the route outline screen containing only the general roads as shown in FIG. 9 or only the toll roads as shown in FIG. 8 is displayed (step ST45). On and after this, every time the "Whole" button, the "General" button or the "Toll" button is touched, a transition takes place between the processing of Step ST44 and that of step ST45.

Then, it is checked whether or not the setting is changed, namely, a check of the check button is changed (step ST46) on the route outline screen. When it is judged in step ST 46 that the setting is not changed, the process returns to step ST 42, and the processing mentioned above is repeated.

Otherwise, when it is judged in step ST46 that the setting is changed, the alternative route selecting screen shown in FIG. 11 is displayed (step ST47). A user operates the "Previous Candidate" button, the "Next Candidate" button, and the "All Route" button on the alternative route selecting screen for displaying and confirming a plan for the alternative routes. When a desired route is determined, the user touches the "Decision" button. Thereby, the process returns to step ST42, the route confirming screen is displayed, and the processing mentioned above is repeated.

As described above, according to the navigation system of the third embodiment of the present invention, after completion of the route search containing the special roads as set forth in the first embodiment or the second embodiment, confirmation and a change of the route can be executed in pursuance to the procedure similar to that of the first embodiment or the second embodiment, which enables improving route selecting efficiency of a user.

What is claimed is:

1. A navigation system comprising:
    a current position calculating unit to calculate the current position of a mobile unit;
    an input unit to input the destination and transit points thereof;
    a route searching section searching for a route from the current position calculated by the current position calculating unit to the destination or the transit points inputted by the input unit; and
    a guiding section guiding a user along a route searched by the route searching section,
    wherein the navigation system further comprises a control section, which, when the route searched by the route searching section contains a plurality of special roads, causes the propriety of use for each of the special roads contained in the searched route to be individually selected; and wherein the route searching section makes a re-search for a route containing the selected special roads.

2. The navigation system according to claim 1, wherein the control section, when the route searched by the route searching section contains the plurality of special roads, displays the special roads contained in the searched route, and causes the propriety of use for each of the special roads to be selected.

3. The navigation system according to claim 1, wherein the control section, before making a route search by the route searching section, causes the propriety of use of the special roads to be set as a route condition, and the route searching section, when the use of the special roads is set by the control section, searches for a route from the current position calculated by the current position calculating unit to the destination or the transit points inputted by the input unit.

4. The navigation system according to claim 3, wherein the control section, when the route searched by the route searching section contains the plurality of special roads, displays the special roads contained in the searched route, and causes the propriety of use for each of the special roads to be selected.

5. The navigation system according to claim 1, wherein the route searching portion, even if the propriety of use of the special roads is not set as a route condition by control of the control section before making a route search, searches for a route from the current position calculated by the current position calculating unit to the destination or the transit points inputted by the input unit, and the control section, when the route searched by the route searching section contains the plurality of special roads, displays the special roads contained in the searched route, and causes the propriety of use for each of the special roads to be selected.

6. The navigation system according to claim 1, wherein the control section, after a search by the route searching section, displays recommended routes and causes one route from thereamong to be selected.

7. The navigation system according to claim 4, wherein the control section displays information buttons by linking the buttons with the displayed special roads, and when the information button is selected, displays the detailed information on the special roads linked with the information button.

\* \* \* \* \*